(12) United States Patent
Jocham et al.

(10) Patent No.: US 9,356,379 B2
(45) Date of Patent: May 31, 2016

(54) HOUSING FOR AN ELECTRICAL MACHINE COMPRISING A SEAL

(71) Applicant: Robert Bosch GmbH, Stuttgart (DE)

(72) Inventors: Reinhold Jocham, Hechingen (DE); Joerg Moessner, Wannweil (DE)

(73) Assignee: Robert Bosch GmbH, Stuttgart (DE)

( * ) Notice: Subject to any disclaimer, the term of this patent is extended or adjusted under 35 U.S.C. 154(b) by 56 days.

(21) Appl. No.: 14/106,946

(22) Filed: Dec. 16, 2013

(65) Prior Publication Data

US 2014/0170878 A1    Jun. 19, 2014

(30) Foreign Application Priority Data

Dec. 17, 2012  (DE) .......................... 10 2012 223 431

(51) Int. Cl.
| | |
|---|---|
| *H01R 13/514* | (2006.01) |
| *H01R 13/436* | (2006.01) |
| *H01R 13/52* | (2006.01) |
| *H01R 43/20* | (2006.01) |
| *H02K 5/10* | (2006.01) |
| *H02K 5/22* | (2006.01) |
| *H02K 11/00* | (2016.01) |

(52) U.S. Cl.
CPC .......... *H01R 13/4361* (2013.01); *H01R 13/521* (2013.01); *H01R 43/20* (2013.01); *H02K 5/10* (2013.01); *H02K 5/225* (2013.01); *H02K 11/0073* (2013.01); *H02K 11/33* (2016.01)

(58) Field of Classification Search
CPC ...... H01R 13/40; H01R 13/405; H01R 13/41; H01R 13/4361; H01R 13/4362; H01R 13/52; H01R 13/5202; H01R 13/5205; H01R 13/5208; H01R 13/5219; H01R 13/521; H01R 43/20; H02K 5/10; H02K 5/225; H02K 11/0073
USPC ............. 439/76.1, 733.1, 271, 587, 589, 740, 439/752
See application file for complete search history.

(56) References Cited

U.S. PATENT DOCUMENTS 2,389,454 A * 11/1945 Picard .................... H01R 13/42
                                                                439/740
3,772,637 A * 11/1973 Paullus et al. ................. 439/589

(Continued)

*Primary Examiner* — Amy Cohen Johnson
*Assistant Examiner* — Milagros Jeancharles
(74) *Attorney, Agent, or Firm* — Maginot, Moore & Beck LLP

(57) ABSTRACT

A housing for an electrical machine includes a cover with an electrical plug connection. The plug connection includes at least one electrically conductive contact or a plurality of electrically conductive contacts configured to electrically connect the housing to a plug. The contact is routed through an aperture in the cover and forms an electrical plug contact via an end section that projects out of the cover. The plug connection has a securing element that extends in a flat manner. A lateral dimension of the aperture in the cover is formed such that the contact is routed through the aperture via the end section and engages behind a projection in an interlocking manner by virtue of moving transverse to the longitudinal extent in the aperture. The securing element has at least one aperture that is configured to fix the contact in the aperture transverse to a longitudinal extent of the contact.

15 Claims, 3 Drawing Sheets

(56) References Cited

U.S. PATENT DOCUMENTS

| | | | | | |
|---|---|---|---|---|---|
| 4,420,210 | A | * | 12/1983 | Karol | H01R 13/521 174/452 GM |
| 4,557,543 | A | * | 12/1985 | McCleerey et al. | 439/408 |
| 5,421,748 | A | * | 6/1995 | Mouissie | H01R 13/41 439/740 |
| 5,554,055 | A | * | 9/1996 | Miller | 439/752 |
| 5,890,928 | A | * | 4/1999 | Fuchs | H01R 13/5219 439/278 |
| 5,906,519 | A | * | 5/1999 | Nix et al. | 439/752 |
| 6,368,130 | B1 | * | 4/2002 | Fukuda | 439/271 |
| 2006/0189191 | A1 | * | 8/2006 | Drescher et al. | 439/271 |
| 2011/0034073 | A1 | * | 2/2011 | Umfahrer | H01R 13/405 439/587 |

\* cited by examiner

HOUSING FOR AN ELECTRICAL MACHINE COMPRISING A SEAL

This application claims priority under 35 U.S.C. §119 to patent application no. DE 10 2012 223 431.4 filed on Dec. 17, 2012 in Germany, the disclosure of which is incorporated herein by reference in its entirety.

BACKGROUND

The disclosure relates to a housing for an electrical machine. The housing has a cover, wherein the cover has an electrical plug connection comprising at least one electrically conductive contact, in particular a plug contact, or a plurality of electrically conductive contacts for electrically connecting the housing to a plug.

In housings for an electrical machine which can come into contact with splash water, it is necessary for both the electrical contacts and also the electrical components in the interior of the housing to be protected against penetrating moisture.

In embodiments of the housing in which the electrical plug contacts, which form an outer electrical connection for connecting the housing to a plug and which are routed to the outside through an aperture in the housing, can form a weak point for penetrating moisture in this case, said penetrating moisture being able to pass through a gap between the housing wall in the region of the aperture for the plug contact and the plug contact and into the interior of the housing.

SUMMARY

According to the disclosure, the at least one contact is routed through an aperture in the cover, wherein the contact forms an electrical plug contact by way of an end section which projects out of the cover. The plug connection has a securing element which extends in a flat manner.

A lateral dimension of the aperture in the cover is preferably formed in such a way that the contact can be routed through the aperture by way of the end section and can engage behind a projection in an interlocking manner by virtue of moving transverse to the longitudinal extent in the aperture.

The securing element has at least one aperture for the at least one contact and is designed to fix the at least one contact in the aperture transverse to a longitudinal extent of the contact.

As a result, the contact can be firmly held in the aperture in a simple manner.

In a preferred embodiment, a plug collar is integrally formed on the cover, wherein the end section of the at least one contact projects into a hollow space which is enclosed by the plug collar. The securing element is preferably designed to be supported against the plug collar and in this way to fix the at least one contact in the aperture transverse to its longitudinal extent of the contact. In this way, the securing element advantageously forms a fixing apparatus for the plug contact.

The plug contact can be designed, for example, in a T- or L-shaped manner in the region of the cutout.

Furthermore, by means of the locking arrangement formed in this way, a force which is as low as possible can advantageously be exerted on the plug contact in its longitudinal direction during insertion and during locking. Therefore, a printed circuit board which is connected to the plug contact can advantageously not be subjected to loading, or will be subjected to only slight loading, when the housing cover is fitted onto the plug contacts. The contact pin can advantageously be held in the locked position by means of the abovementioned contact-pressure element, in particular a contact-pressure plate.

The plug connection preferably has an elastic seal which extends in a flat manner, wherein the end section is routed between the cover wall and one end of the end section through an aperture in the seal.

The securing element is preferably designed to press the seal against the cover and in this way to seal off the aperture.

By virtue of the seal of the housing, which seal is formed in this way, the gap which remains between the plug contact and the wall of the housing in the region of the aperture can advantageously be sealed off in one working step, specifically when the flat seal is pushed onto the end section of the plug contact. In a further step or together with the abovementioned seal, the abovementioned securing element can be pushed onto the plug contact, in particular onto the end section, and press the seal, in its flat extent, against the housing wall in the region of the aperture. In this way, the securing element also forms a constituent part for sealing off the gap between the plug contact and the housing wall in the region of the aperture.

In a preferred embodiment of the housing, the at least one contact has a recess in a longitudinal section, wherein the cover has a projection region in the region of the aperture, said projection region corresponding to the recess. The projection region is designed to engage in the cutout and to secure the contact in an interlocking manner against moving along the longitudinal extent in the aperture. In this way, the plug contact can advantageously be locked after the end section is inserted into the aperture, wherein the projection engages in the cutout in the plug contact during locking.

In a preferred embodiment of the housing, the seal is connected to the securing element. The seal is adhesively bonded to the securing element by means of an adhesive for example.

In another embodiment, the seal is plug-connected to the securing element. To this end, the securing element preferably has a projection region which extends transverse to the flat extent of the contact-pressure element and which is designed to engage in a cutout and/or in an aperture in the seal which extends in a flat manner, and in this way to form a connection with the seal in a force-fitting and/or interlocking manner.

In a preferred embodiment of the housing, the seal is extruded onto the securing element. In this way, one production step, specifically that of fitting the contact-pressure element onto the at least one contact after the seal is fitted, can advantageously be saved.

In a preferred embodiment of the housing, the cover has a tapering insertion funnel in the region of the aperture, said insertion funnel being designed to receive the end section of the contact when it is inserted into the aperture and to route said end section—in particular by way of a component which is transverse to its longitudinal extent—into the aperture. In this way, it is advantageously made easier to fit the cover onto the plug contact, in particular onto a plurality of plug contacts which are connected to the abovementioned printed circuit board.

The disclosure also relates to a method for fixing at least one contact, in particular a plug contact in a cover for a housing, in which method an end section of the contact is routed through an aperture in the cover and is moved transverse to its longitudinal extent in the aperture, wherein a projection region in the aperture engages in a cutout in the contact and locks the contact in an interlocking manner against moving along the longitudinal extent in the aperture.

In the method, the end section, after being routed through the cover, is preferably further routed through an aperture for the end section of an elastic seal which extends in a flat manner. Furthermore, the end section is routed through a securing element which extends in a flat manner, in particular a contact-pressure plate, and has an aperture for the end section at the end section, wherein the securing element presses the seal against the cover and in this way seals off the aperture of the cover—in particular against penetrating moisture.

BRIEF DESCRIPTION OF THE DRAWINGS

The disclosure will now be described below with reference to figures and further exemplary embodiments. Further advantageous variant embodiments are disclosed by the features described in the figures and in the dependent claims.

DETAILED DESCRIPTION

Figure 1:
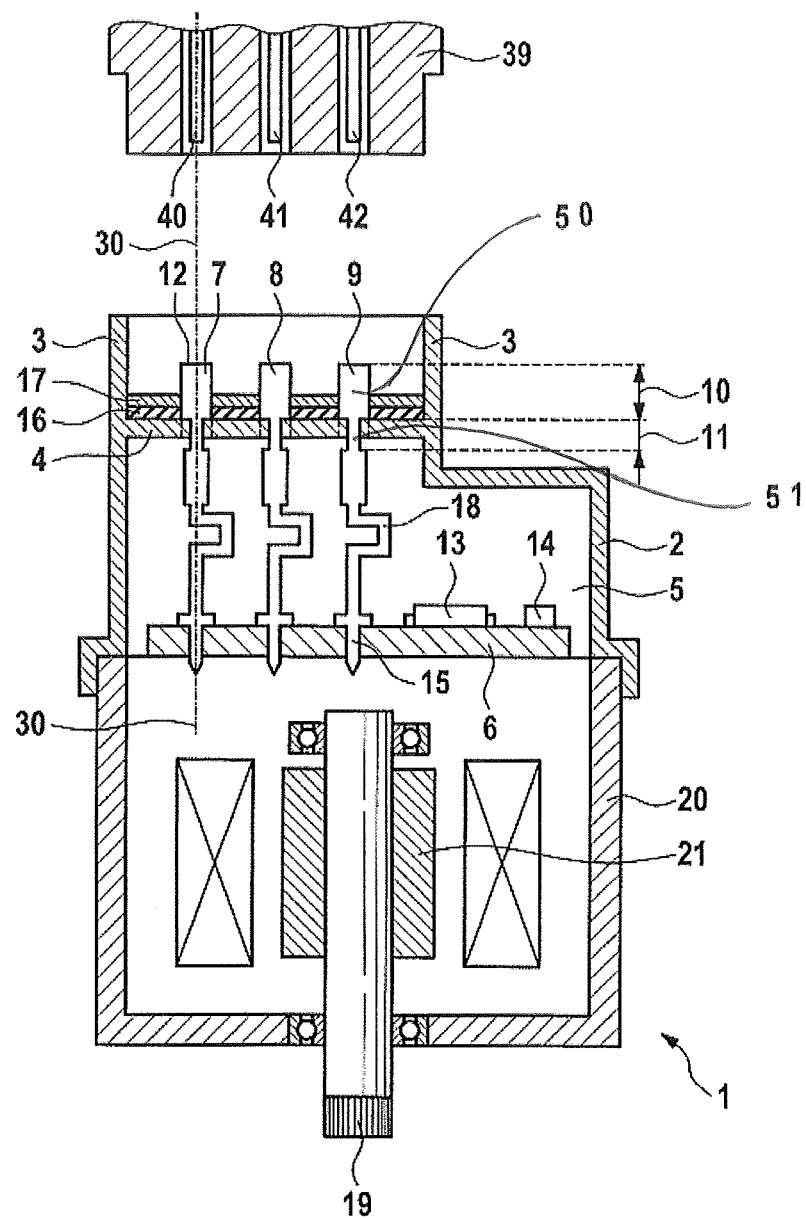
FIG. 1 shows an exemplary embodiment of a housing comprising a sealed-off plug connection comprising a flat seal and a flat contact-pressure plate as a securing element for the flat seal.

FIG. 1 shows an exemplary embodiment of a housing 1 for an electric motor. The electric motor is, for example, an electric motor for a power-steering system. The housing 1 has a cover 2. The cover 2 is, for example, a plastic cover. A plug collar 3 is integrally formed on the cover 2. The plug collar 3, together with a base 4, forms a plug connection for a plug 39, which is partially illustrated, in the region of a hollow space which is enclosed by the plug collar 3.

The electric motor is designed to be electrically connected toward the outside by means of the plug connection. To this end, the plug connection has at least one electrically conductive contact, in this exemplary embodiment three electrically conductive contacts 7, 8 and 9. The electrically conductive contacts 7, 8 and 9 each project by way of an end section 50, which extends along a longitudinal section 10, into the hollow space which is enclosed by the plug collar 3. The contacts 7, 8 and 9 are each routed through an aperture 22, 23, and 24, respectively, (shown in FIG. 2) in the base 4. The apertures in the base 4 are illustrated in greater detail in FIG. 2.

The plug 39 has a mating contact 40, 41 and, respectively, 42 for each of the contacts 7, 8 and 9, wherein the mating contact is designed to make sliding electrical contact with the end section 50.

The contacts 7, 8 and 9 each have a recess 51 in a longitudinal section 11 which adjoins the end section 10. In this way, the contacts 7, 8 and 9 can—as illustrated in greater detail in FIG. 2—be moved transverse to their longitudinal extent after the end section is routed through the aperture in the base 4 and said contacts can be secured in an interlocking manner against moving back through the aperture.

In this exemplary embodiment, the contacts 7, 8 and 9 are in the form of plug contacts which are to be connected to a plug, in particular to the plug 39. The contacts 7, 8 and 9 each have a meandering section 18 which extends between the longitudinal section 11 and an end section 15 which is designed to be electrically connected to a printed circuit board. The meandering section 18 of the contact 9 and the end section 15 of the contact 9 are identified by way of example. The contact 9 is soldered in the printed circuit board 6 by way of the end section 15 for example. In this exemplary embodiment, the printed circuit board 6 forms a circuit mount for the control electronics system of the abovementioned electric motor. A microprocessor 13 and a capacitor 14 are connected to the printed circuit board by way of example.

The electric motor has a motor housing 20 and a rotor 21 which is accommodated by the motor housing 20. The rotor 21 is, for example, of permanent-magnet design and is connected to a rotor shaft 19 which can be connected to a gear mechanism by way of an end section which projects out of the housing 20.

The printed circuit board 6 is accommodated in a hollow space 5 which is enclosed by the cover 2.

The contacts 7, 8 and 9 are each routed through an elastic seal 16 which extends in a flat manner, for example a silicone rubber seal, at the end section 50. The housing 1 also has a securing element 17 which extends in a flat manner and which is in the form of a contact-pressure plate in this exemplary embodiment. The contacts 7, 8 and 9 are at least partially routed through the securing element 17 by way of the end section 50, so that the seal 16 and the securing element 17 are arranged along a longitudinal extent 30 of the contact element between one end 12 of the end section 50 and the base 4 of the plug connection.

Figure 4:
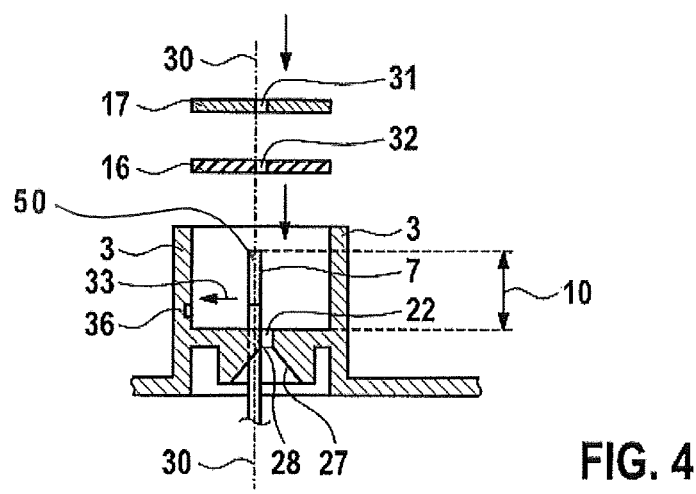
FIG. 4 shows further method steps in which the seal and the contact-pressure plate are fitted onto the contact.
Figure 5:
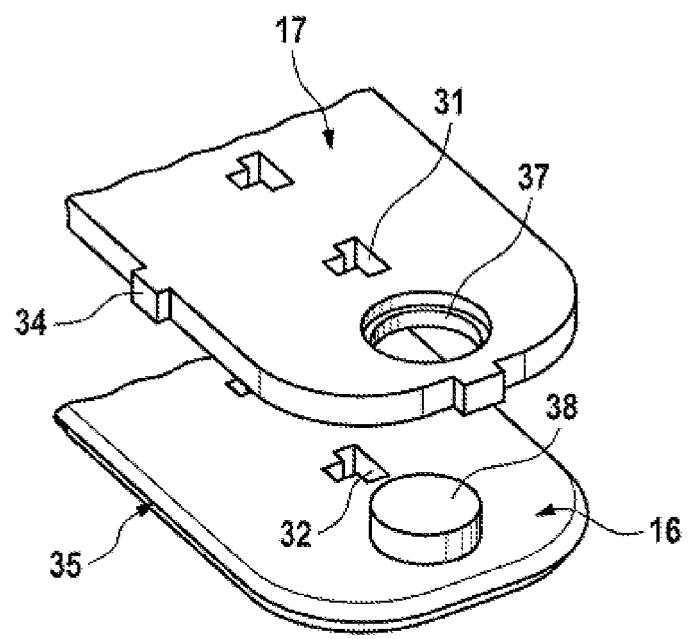
FIG. 5 shows a portion of the contact-pressure plate which is shown in FIGS. 1 and 4 and of the flat seal in detail.

The seal 16 and the securing element 17 each have an aperture—illustrated in greater detail in FIG. 4 and in FIG. 5—for the end sections 10 of the contacts 7, 8 and 9.

The meander 18 is designed to counteract a force, which acts along a longitudinal extent of the contact 9, in a spring-like manner, so that the electrical connection between the end section 15 and the printed circuit board 6 can be relieved of force.

Figure 2:
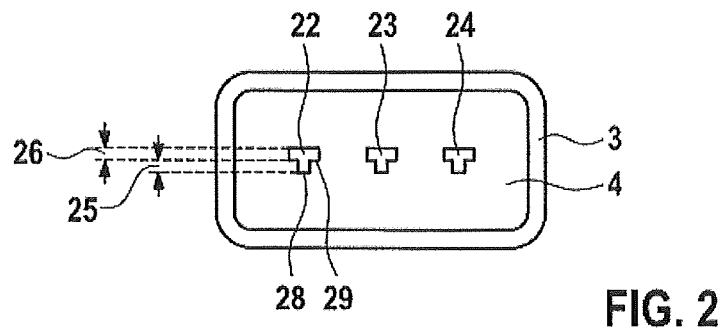
FIG. 2 shows a plan view of the plug connection, said plan view also showing the apertures for the contacts, which are illustrated in FIG. 1, of the plug connection in cross section.

FIG. 2 shows a plan view of the plug connection of the housing 2 which has already been illustrated in FIG. 1, in particular the plug collar 3 and the base 4 of the plug connection. The base 4 of the cover 2 has three apertures 22, 23 and 24. The contact 7 illustrated in FIG. 1 is routed through the aperture 22, the contact 8 is routed through the aperture 23, and the contact 9 is routed through the aperture 24. The apertures 22, 23 and 24 each have at least one projection region, in this exemplary embodiment two projection regions, wherein the projection regions 28 and 29 on the aperture 22 are identified by way of example. The contact 7 can be fitted when the cover 2 is fitted onto the contacts 7, 8 and 9 which are already connected to the printed circuit board 6. In the process, the end section 50 of the contact 7 passes through the aperture 22 in the region 26 of the aperture. Once the end section 50 has been routed through the aperture 22 in the region 26, the contact 7 can be moved into a region 25 of the aperture 22 by way of the end section 50, as a result of which the contact 7—by virtue of its T-shape—is secured in an interlocking manner against moving back through the aperture 22.

Figure 3:
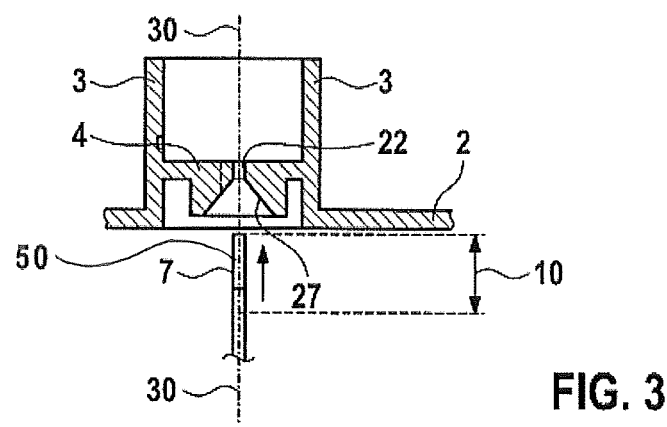
FIG. 3 shows a sectional illustration through the plug connection which is illustrated in FIG. 1, wherein insertion of the contact into the aperture as the first method step for generating the plug connection is also shown.

FIG. 3 shows a sectional illustration through the plug connection which has already been illustrated in FIGS. 1 and 2. Said figure shows the contact 7 which is routed through the aperture 22 in the base 4 of the cover 2 by way of its end section 50. The cover 2 is designed to make it easier to insert the end section 50 of the contact 7 through the aperture 22. To this end, the cover 2 has an insertion funnel 27 in the region of the plug connection, in particular in the region of the base 4. The insertion funnel 27 is of tapering design along a longitudinal extent of the aperture 22 which extends transverse to a flat extent of the base 4. As illustrated in FIG. 3, the end section 50 of the contact 7 can be routed through the aperture 22 in a method step in order to be connected to the cover 2.

FIG. 4 shows further method steps for connecting the cover 2 to the contact 7 and for sealing off the aperture 22. After the end section 50 of the contact 7 has been routed through the aperture 22, the contact 7 can be pivoted transverse to its longitudinal extent 30 in direction 33. In the process, the end section 50 engages behind the projection regions 28 and 29. After said contact has been pivoted transverse to the longitudinal extent 30 in direction 33, the seal 16 can be fitted onto the contact 7. To this end, the end section 50 of the contact 7 is routed through an aperture 32 in the seal 16. In this exemplary embodiment, the aperture 32 has a smaller diameter than the contact 7 in the region of the end section 50. In this way, the seal 16 is elastically expanded in the region of the aperture 32 and can provide sealing in relation to the contact 7. After the seal 16 is fitted onto the contact 7, the securing element 17 which has already been described in FIG. 1 and which has on the aperture 31 for the plug contact 7 can be plugged onto the plug contact 7. To this end, the contact 7 is routed through the aperture 31 by way of the end section 50.

The securing element 17, which is in the form of a contact-pressure plate in this exemplary embodiment, can be pressed against the seal 16, for example, by virtue of the plug 39 which is illustrated in FIG. 1 being fitted onto the plug connection or locked—by way of the plug collar 3, in particular cutouts in the plug collar 3. After the contact-pressure element 17 is fitted, the contact 7 is secured against moving back counter to the direction 33, that is to say from the region 25 of the aperture 22 to the region 26 of the aperture 22. Therefore, the securing element 17 advantageously has two different functions, specifically that of pressing the seal 16 against the base 4 in order to seal off the aperture 22, and of securing the contact 7 in an interlocking manner against moving out of the aperture 22.

FIG. 5 shows portions of the seal 16 which has already been illustrated in FIGS. 1 and 4 and of the securing element 17. The seal 16 which extends in a flat manner has a sealing lip 35 which can provide sealing in relation to the plug collar 3. Said figure also shows the aperture 32 in the seal 16 and the aperture 31 in the securing element 17. In this exemplary embodiment, the securing element 17 has projection regions which extend toward the outside radially in the flat extent, the projection 34 of said projection regions being identified by way of example. In this exemplary embodiment, the projections like the projection 34 can serve as positioning aids for the contact-pressure element 17 or—in addition to or independently of the function as a positioning aid—can lock in a corresponding cutout 36, which is illustrated in FIG. 4, in the plug collar 3.

In this exemplary embodiment, the securing element 17 has an aperture 37 which is designed to receive a cam 38 of the seal 16, wherein the cam 38 is integrally formed on the seal 16 and extends transverse to the flat extent of the seal 16. In this way, the seal 16 can be connected in a force-fitting manner to the securing element 17 after the cam 38 engages in the aperture 37.

In contrast to the illustration in FIG. 5, the seal 16 can be extruded onto the securing element 17. As a result, one production step, specifically that of additionally fitting the contact-pressure element 17 onto the contacts 7, 8 and 9, can be dispensed with.

What is claimed is:

1. A housing for an electrical machine, comprising:
a cover having an electrical plug connection, the electrical plug connection including at least one electrically conductive contact configured to electrically connect the housing to a plug,
wherein the at least one contact is routed through an aperture in the cover and forms an electrical plug contact by way of an end section that projects out of the cover,
wherein the plug connection has a securing element that extends in a flat manner,
wherein a lateral dimension of the aperture in the cover is formed in such a way that the at least one contact is configured to be routed through the aperture in the cover in a first direction by way of the end section and to engage behind a projection region in an interlocking manner by virtue of moving the at least one contact transverse to a longitudinal extent of the at least one contact in the aperture in the cover, and
wherein the securing element has an aperture configured to fix the at least one contact in the aperture in the cover transverse to a longitudinal extent of the at least one contact.

2. The housing according to claim 1, wherein a plug collar is integrally formed on the cover and the end section of the at least one contact projects into a hollow space enclosed by the plug collar, and wherein the securing element is configured to be supported against the plug collar so as to fix the at least one contact in the aperture in the cover transverse to a longitudinal extent of the at least one contact.

3. The housing according to claim 1, wherein:
the housing has an elastic seal that extends in a flat manner,
a portion of the end section, between the cover and one end of the end section, is configured to be inserted through an aperture in the seal, and
the securing element is configured to press the seal against the cover so as to seal off the aperture in the cover.

4. The housing according to claim 1, wherein the at least one contact has a recess in a longitudinal section, and the cover has a projection region in a region of the aperture in the cover, the projection region corresponding to the recess and being configured to engage in the recess in the at least one contact and to secure the at least one contact in an interlocking manner against moving along the longitudinal extent in the aperture in the cover.

5. The housing according to claim 1, wherein the seal is connected to the securing element.

6. The housing according to claim 5, wherein the seal is plug-connected to the securing element.

7. The housing according to claim 5, wherein the seal is extruded onto the securing element.

8. The housing according to claim 1, wherein the cover has a tapering insertion funnel in a region of the aperture in the cover, the insertion funnel being configured to receive the end section of the at least one contact when it is inserted into the aperture in the cover and to route the end section into the aperture in the cover.

9. The housing according to claim 1, wherein the at least one electrically conductive contact is configured as a plug contact.

10. The housing according to claim 1, wherein interlocking the at least one contact with projection region constrains movement of the at least one contact in the first direction and in a direction opposite the first direction.

11. A method for fixing at least one contact in a cover for a housing, comprising:
routing an end section of the at least one contact through an aperture in the cover in a first direction; and
moving the end section transverse to its longitudinal extent in the aperture in the cover,
wherein a projection region in the aperture in the cover engages in a cutout in the at least one contact and blocks the at least one contact in an interlocking manner against moving along the longitudinal extent in the aperture in the cover.

12. The method according to claim 11, further comprising:
routing the end section through an aperture of an elastic seal after the end section is routed through the cover, the elastic seal extending in a flat manner; and
routing a securing element with an aperture onto the end section, the securing element extending in a flat manner, wherein the securing element is configured to press the seal against the cover so as to seal off the aperture of the cover.

13. The method according to claim 12, wherein the securing element is configured as a contact-pressure plate.

14. The method according to claim 11, wherein the at least one contact is configured as a plug contact.

15. The method according to claim 11, wherein the projection region blocks the at least one contact against moving in the first direction and moving in a direction opposite the first direction.

* * * * *